Patented Sept. 1, 1936

2,053,029

UNITED STATES PATENT OFFICE 2,053,029

PROCESS FOR THE MANUFACTURE OF ESTERS OF ALIPHATIC ACIDS

Henri Martin Guinot, Melle, Deux-Sevres, France, assignor to Usines de Melle, Melle, Deux-Sevres, France, a corporation of France No Drawing. Application March 14, 1935, Serial No. 11,165. In France March 15, 1934

10 Claims. (Cl. 260—106)

This invention relates to the manufacture of esters of aliphatic acids. In the prior United States Patent No. 1,982,160 there is described a process of manufacturing aliphatic acids by oxidizing an alcohol by means of an oxidizing agent capable of regeneration by electrolysis, extracting the resultant acid by a suitable solvent, regenerating the residual spent oxidizing agent by electrolysis for re-use, and separating the acid-solvent mixture into acid and solvent.

The principal object of the present invention is to modify the aforesaid prior process by eliminating the step of extraction by means of a solvent, and by subjecting the crude oxidation product direct to esterification.

A further object is to produce the esters of aliphatic alcohols by oxidizing the alcohols by means of an oxidizing agent capable of regeneration by electrolysis and of acting in its reduced state as an esterification catalyst, followed by subjecting the crude oxidation product to esterification of its acid content, separating the ester and regenerating the spent oxidizing agent. The esterification of the acid in the crude oxidation product may be carried out in any known manner. One might proceed in accordance with the process of the aforesaid prior patent to the stage of adding an acid-extracting solvent and then esterify the acid-solvent mixture, examples of suitable processes for such operation being described in British Patents Nos. 361,888 and 378,498. However, I have found that it is much more advantageous to omit the addition of solvent and to treat the crude oxidation product direct to esterification and this is the essential feature of the present invention. Preferably I operate in the following manner:—Having effected oxidation under the same conditions as described in the aforesaid prior patent, the crude oxidation product is sent direct to a column charged with alcohol in order to effect esterification in accordance with known methods especially the methods described in the prior United States Patents Nos. 1,400,849 and 1,454,462. I have found by experience that these latter methods are applicable with particular advantage in the case of the above-mentioned crude oxidation product, and that a very small number of still plates is sufficient to effect the total esterification of the acid. Furthermore, the complex chromium salts present in the solution have been found to be powerful catalysts of esterification, with the result that it is unnecessary to use a special catalyst.

The solution of chromium salts, completely freed from acetic acid, flows out of the base of the still and is regenerated by electrolysis as in the aforesaid prior United States Patent No. 1,982,160.

Example

The solution of acetic acid and chromium salts obtained by oxidizing alcohol in accordance with the United States Patent No. 1,982,160 and containing about 70 grams of acetic acid and 450 grams of chromium and sodium sulphates per litre is introduced at the top of a distillation column consisting of plates having a large reserve of liquid and provided with indirect heating at the bottom.

Alcohol vapour is introduced into the column at a level a few plates above the base plate, and traverses the plates and reacts with the liquid descending from plate to plate to an extent proportional to the amount of acetic acid present in the liquid. In this manner the vapour leaving the top of the column contains the whole of the acid in the form of ethyl acetate, also excess of alcohol, and water. This vapour is transferred to a concentration column from the top of which the ternary azeotropic mixture of water—alcohol—ester is easily obtained. The ester can be separated from this mixture by any known method, for example by washing with water the mixed vapours so as to remove the alcohol therefrom (see British Patent No. 234,458). Alternatively the mixture can be treated by distillation and rectification as described in British Patent No. 130,968 to recover the ester, or the azeotropic mixture can be brought into contact with a body of water thereby forming two layers of liquid containing respectively high and low percentages of ester, and the ester can be obtained substantially free from water by rectifying the layer containing the higher percentage of ester (see British Patent No. 195,117).

The liquid collected in the base of the column is free from acetic acid and alcohol and is regenerated for re-use. Preferably this liquid, which has become diluted with the water of the esterification reaction, is concentrated to a suitable degree (adequate for the electrolysis and re-use) by a partial evaporation and a withdrawal of the steam from the base of the column.

What I claim is:—

1. A method of producing esters of aliphatic acids which comprises oxidizing an alcohol by means of an oxidizing agent capable of regeneration by electrolysis, subjecting the crude mixture resulting from the oxidation to esterification of its acid content and separating the ester formed, said oxidizing agent comprising essentially a chromium salt.

2. A method of producing esters of aliphatic acids which comprises oxidizing an alcohol by means of an oxidizing agent comprising essentially a salt of chromium and capable of regeneration by electrolysis, distilling the crude mixture resulting from the oxidation with an alcohol to esterify the acid contained therein, and separating the ester from the other reaction products.

3. A method of producing esters of aliphatic acids which comprises oxidizing an alcohol by means of a bichromate capable of regeneration by electrolysis esterifying the resultant acid in the presence of the other products of the oxidation, and separating the ester.

4. A method of producing esters of aliphatic acids which comprises oxidizing an alcohol by means of an oxidizing agent comprising essentially a salt of chromium and capable of regeneration by electrolysis, esterifying the resultant acid in the presence of the other products of the oxidation, separating the ester, and regenerating the residual spent oxidizing agent.

5. A method of producing esters of aliphatic acids which comprises oxidizing an alcohol by means of an oxidizing agent comprising essentially a salt of chromium and capable of regeneration by electrolysis, transferring the resultant acid and other products of the oxidation to a heated column still, supplying an alcohol vapour to said still to esterify said acid, separating the ester from the distillate from said still, and regenerating the residual spent oxidizing agent.

6. A method of producing esters of aliphatic acids which comprises oxidizing an alcohol by means of an oxidizing agent capable of regeneration by electrolysis, esterifying the resultant acid in the presence of the other products of the oxidation, separating the ester, and subjecting the spent oxidizing agent to electrolytic regeneration, said oxidizing agent comprising essentially a chromium salt.

7. A method of producing esters of aliphatic acids which comprises oxidizing an alcohol by means of an oxidizing agent capable of regeneration by electrolysis, subjecting the resultant acid in the presence of the other products of the oxidation, to countercurrent action with the vapour of an alcohol, leading off the mixture of resultant ester and unchanged alcohol and water vapour, and separating the ester from said mixture, and regenerating the spent oxidizing agent by electrolysis, said oxidizing agent comprising essentially a chromium salt.

8. A method of producing esters of aliphatic acids which comprises oxidizing an alcohol by means of a bichromate capable of regeneration by electrolysis and of acting in its eventually reduced state as a catalyst for esterification, subjecting the crude mixture resulting from the oxidation to esterification of its acid content, and separating the ester formed.

9. A method of producing esters of aliphatic acids which comprises oxidizing an alcohol by means of an oxidizing agent comprising essentially a salt of chromium and capable of regeneration by electrolysis and of acting in its eventually reduced state as a catalyst for esterification, esterifying the resultant acid in the presence of the other products of the oxidation, and separating the ester.

10. A method of producing esters of aliphatic acids which comprises oxidizing an alcohol by means of an oxidizing agent capable of regeneration by electrolysis and of acting in its eventually reduced state as a catalyst for esterification, esterifying the resultant acid in the presence of the other products of the oxidation, separating the ester, and subjecting the spent oxidizing agent to electrolytic regeneration, said oxidizing agent being a salt of chromium.

HENRI MARTIN GUINOT.